C. G. TUCKER.
MACHINE FOR CUTTING CRACKERS.
APPLICATION FILED MAR. 16, 1908.

909,967.

Patented Jan. 19, 1909.

2 SHEETS—SHEET 1.

Witnesses:
Fritz Staempfli.
Otto L. Koch.

Clare G. Tucker, Inventor
By D. K. Allison
his atty.

C. G. TUCKER.
MACHINE FOR CUTTING CRACKERS.
APPLICATION FILED MAR. 16, 1908.
909,967.
Patented Jan. 19, 1909.
2 SHEETS—SHEET 2.
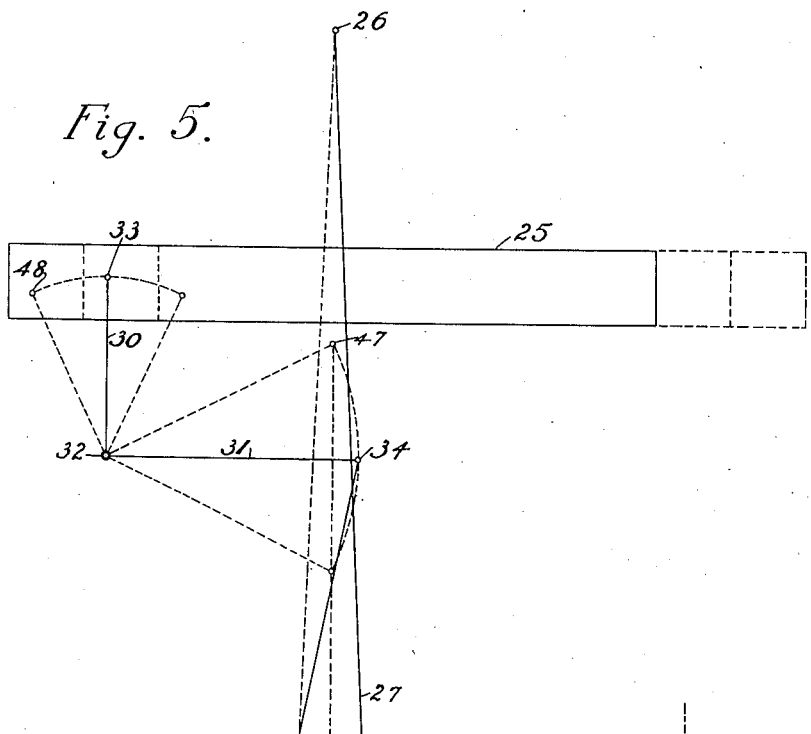
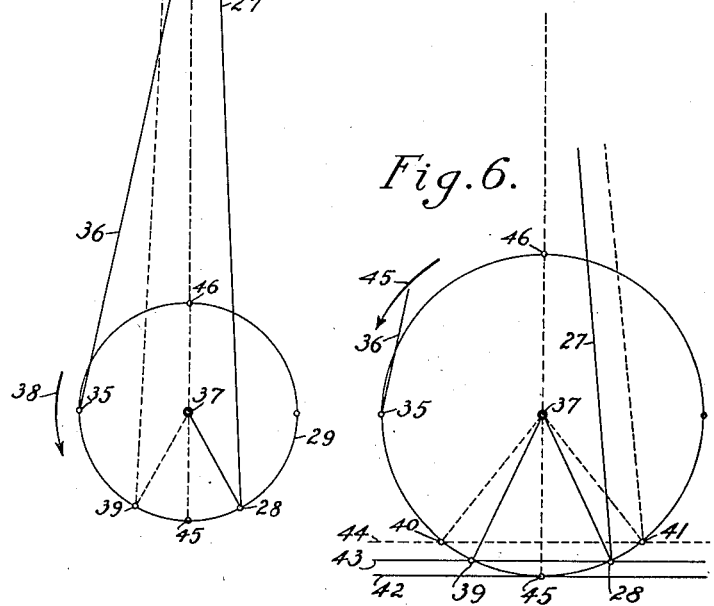
Witnesses:
Fritz Staempfli
Otto L. Koch
Clare G. Tucker, Inventor
By D. K. Allison
his atty.

UNITED STATES PATENT OFFICE.

CLARE G. TUCKER, OF CINCINNATI, OHIO, ASSIGNOR TO THE J. H. DAY COMPANY, OF CINCINNATI, OHIO.

MACHINE FOR CUTTING CRACKERS.

No. 909,987.      Specification of Letters Patent.      Patented Jan. 19, 1909.

Application filed March 16, 1908. Serial No. 421,326.

*To all whom it may concern:*

Be it known that I, CLARE G. TUCKER, a citizen of the United States, residing at Cincinnati, in the county of Hamilton and the State of Ohio, have invented certain new and useful Improvements in Machines for Cutting Crackers and the Like, of which the following is a specification.

My invention relates to machines for making crackers, biscuits and the like in which a vertically reciprocating cutter-head provided with cutting dies operates upon a sheet of dough which travels continuously through the machine and cuts the same into crackers or biscuits without interrupting the travel thereof and I particularly refer to a patent issued to Paul S. Ward, dated September 10th, 1907, Number 865,461, upon which I claim this invention is an improvement.

The object of my invention is to provide suitable means of adjustment for the device which imparts longitudinal motion to the cutter-head so that the dies which cut the dough may perform the cutting operation and lift out of the dough without disfiguring any of the cut pieces or crackers. I have discovered by experiment that the cutting dies must be traveling in exact unison with the sheet of dough at the instant they lift out of the dough in order to leave the cut pieces or crackers in perfect shape; in other words, if the dies, at the instant of lifting out of the dough, are not traveling in exact unison with the dough sheet but at a greater or less rate of speed, the cut pieces of dough will be disfigured as a consequence. On account of the various sizes of crackers to be cut upon the machine it is difficult, if not impossible, to attain this result without providing means of adjusting the parts which produce the longitudinal movement in relation to the parts which produce the vertical movement of the cutter-head—hence I have devised such means of adjustment.

Figure 1:
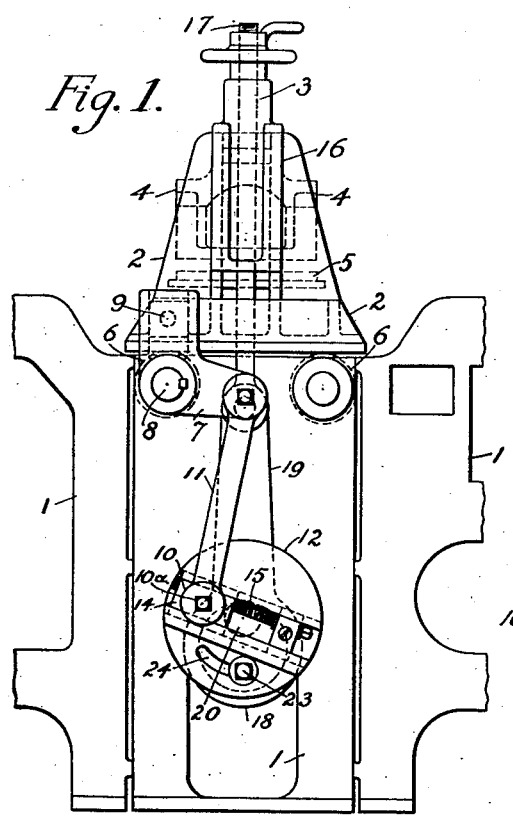
Figure 2:
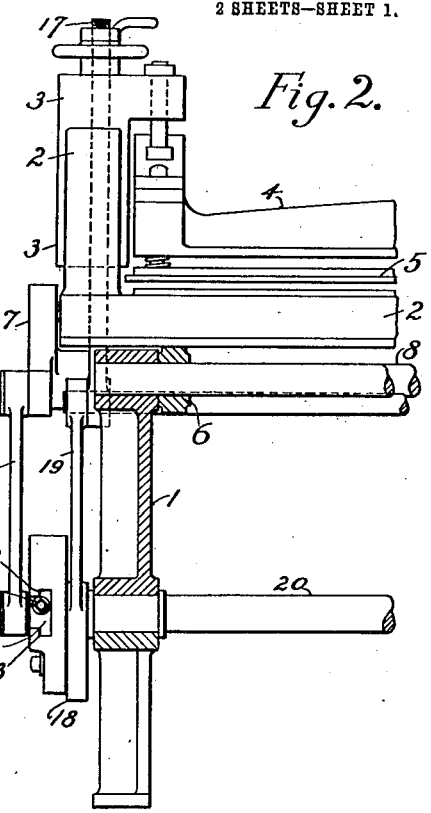
Figure 3:
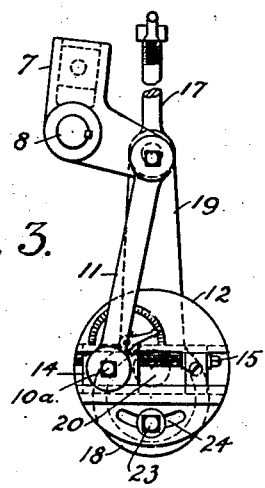
Figure 4:
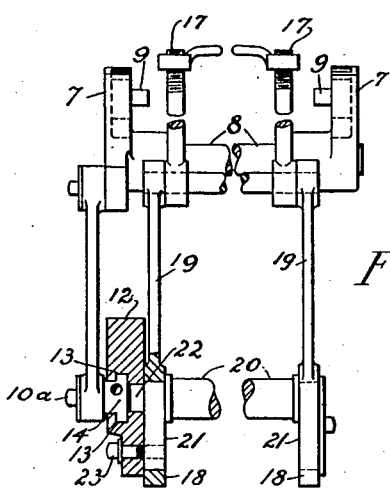

In the accompanying drawings Figure 1 is a side elevation of a portion of the frame of a cracker machine showing the cutter-head and its operating mechanism; Fig. 2 is a partial transverse section through the frame showing same parts as Fig. 1; Fig. 3 is a side elevation of the mechanism which produces the longitudinal and the vertical movements of the cutter-head; Fig. 4 is an end view of the parts shown in Fig. 3; Fig. 5 is a diagram used to describe the longitudinal and vertical movements of the cutter-head; Fig. 6 is an enlarged view of a portion of Fig. 5.

1—1 are a portion of the frame of the machine.

The sliding frame 2, the reciprocating heads 3—3, the die head 4 and the die plate 5 comprise the cutter-head. The die plate holds the dies in any well known manner. The sliding frame 2 rests upon the rollers 6—6 and slides forward and backward thereupon in a longitudinal direction, carrying with it the other parts of the cutter-head. This longitudinal movement is given to it by the bell-cranks 7—7 which are mounted upon the rock-shaft 8, mounted in the frame. The bell-cranks 7—7 carry the studs 9—9 which drive the sliding head 2. The bell-crank 7 is connected to the adjustable crank 10 by the pitman 11 mounted on the crank pin 10ª. The adjustable crank 10 is composed of a crank disk 12 provided with ways 13 in which a T head 14 is slidably mounted, the crank arm thereof being adjustable to greater or less length by the screw 15. The vertical movement of the die plate 5 is obtained by means of the connecting rods 17—17, the eccentric straps 18—18, the eccentrics 21—21, and the rods 19—19, operating upon the die head 4 through the reciprocating heads 3—3 which are confined within the slots 16—16 in the sliding frame 2.

Integral with the shaft 20 and projecting beyond the eccentric at one end is the boss 22 which is concentric with said shaft. The crank disk 12 is separate from the shaft 20 and fits over this boss 22 which serves to bring the center of the crank disk in alinement with the center of the shaft 20. The crank disk 12 is secured to the crank shaft 20 by means of the screw 23 tapped into the eccentric 21 and working in the circular slot 24 in the crank disk. By means of this screw and slot I am able to turn the crank disk on the shaft a limited amount without turning the shaft. By this construction I am enabled to adjust the crank disk 12 in relation to the eccentric 21. While I have shown this means of adjustment between the crank disk 12 and the eccentric 21 I do not wish to confine myself to the construction shown but rather wish to claim broadly means for circular adjustment between the two members mentioned or their equivalents.

The construction shown, except the means of adjustment between the two members mentioned, is shown and described in the patent above referred to, but the relationship between the two cranks, viz: the one on the crank disk and the eccentric, essential to produce the best results, is not included in the aforesaid patent, but is a discovery of my own, resulting from my own experiments. I have therefore laid out the desired relationship between the two cranks mentioned and have chosen to describe the same by means of the diagram shown in Figs. 5 and 6. In Fig. 5 the solid line rectangle 25 represents the bottom part of the sliding frame 2 over which the apron and dough sheet travel and upon which the dies descend to cut the same into crackers. The point 26 represents the connection between the reciprocating head 3 and the connecting rod 17. The solid line 27 represents the rod 19 and the connecting rod 17; and the point 28 represents the center of the eccentric 21. For the purpose of clearness I have represented the circular line of travel of the center of the eccentric 21 and the circular line of travel of the center of the crank pin 10$^a$ by the circle 29. The solid lines 30 and 31 represents the bell-crank 7 pivoted at 32 which represents the rock shaft 8. The line 36 represents the pitman 11 connected at one end to the bell crank 7 at the point 34 and at the other end to the crank pin 10$^a$ at the point 35. The center of the circle 37 represents the center of the crank shaft 20. The arrows 38 and 45 show the direction of rotation of the crank shaft. The lines 42 and 43 represent thickness of thin dough, the lines 42 and 44 represent thickness of thick dough. When the center of the eccentric 21 is at the point 46 the cutting dies are elevated to their extreme height, and when at 45 they have descended to their lowest position and have cut through the dough. The point 39 is represented as the position of the center of the eccentric when the dies are entering, and the point 28 represents the position of the center of the eccentric when they are leaving the dough. The points 40 and 41 correspond to 39 and 28 respectively when thick dough is used. It is evident that when the crank pin 10$^a$ is at 46, the point 34 is at 47 and the point 33 is at 48, the sliding frame represented by 25 is in its foremost position represented by full lines and in a state of rest and as the point 46 moves toward the position 35 its movement in a vertical direction increases from zero at 46 to its maximum movement at 35 which at that point is equal to its circular movement; consequently, during the interval in which the point 46 is moving toward the position 35 the point 48 is acquiring a corresponding accelerated movement from the state of rest at 48 to a speed equal to the speed of the apron at the position 33. It is now evident that the longitudinal movement of the cutting dies is at its maximum speed when the crank pin 10$^a$ has reached the point 35 and that beyond that position the forward movement thereof is retarded. When the cutting dies are entering the dough and the center of the eccentric 21 is at the position 39 the crank pin 10$^a$ will be located in a certain position upon the circle 29 between the points 46 and 35 and as the crank shaft rotates the center of the eccentric will advance to the position 28 where the dies will be lifting out of the dough and at this instant the crank pin 10$^a$ will have advanced to the point 35 where the maximum longitudinal movement is given to the cutting dies. Where thicker dough is used the center of the eccentric and the crank pin 10$^a$ may be so adjusted that the dies will leave the dough at the instant the crank pin has acquired its maximum vertical movement. Such relative positions are shown by the points 41 and 35 respectively. When the eccentric 21 and the crank pin 10$^a$ are so adjusted that the longitudinal movement of the dies are equal in speed to that of the apron and traveling dough sheet at the instant they are lifting out of the dough, the machine will produce crackers perfect in pattern and design and free from disfigurement.

I have discovered that the best results are attained when the eccentric 21 and the crank pin 10$^a$ are so adjusted that the dies may leave the dough at the instant they have attained their maximum longitudinal movement which should be in exact unison with the travel of the apron, which uniform movement is acquired by adjusting the crank arm of the crank 10 by the screw 15.

Having described my invention, what I claim as new and desire to secure by Letters Patent is:

1. In a machine for cutting crackers and the like, the combination of a reciprocating cutter-head having cutting dies, means for imparting vertical movement to said cutter-head, simultaneously operating means for imparting longitudinal movement to said cutter-head with means for adjusting the aforesaid means to change the relation between the aforesaid movements of the cutter-head.

2. In a machine for cutting crackers and the like, the combination of a reciprocating cutter-head carrying cutting dies, means having a circuit of motion for imparting vertical movement to said cutter-head, simultaneously operating means having a similar circuit of motion for imparting longitudinal movement to said cutter-head together with means for adjusting the aforesaid means in their circuits to effect a change of relation between the aforesaid movements of the cutter-head.

3. In a machine for cutting crackers and the like, the combination of a reciprocating cutter-head carrying cutting dies, eccentric means for imparting vertical movement to said cutter-head, similar and simultaneously operating means for imparting longitudinal movement to said cutter-head with means for circumferential adjustment of the aforesaid means to effect an adjustable relation between the aforesaid movements of the cutter-head.

4. In a machine for cutting crackers and the like, the combination of a reciprocating cutter-head carrying dies adapted to operate upon a traveling sheet of dough to cut same into crackers, means for imparting vertical movement to said cutter-head to effect the cutting operation, means for imparting longitudinal movement to said cutter-head during the cutting operation together with means for adjusting the relation between the aforesaid means to cause the cutting dies after the cutting operation to lift out of the dough when the same have reached their maximum longitudinal velocity.

5. In a machine for cutting crackers and the like, the combination of a reciprocating cutter-head carrying dies adapted to operate upon a traveling sheet of dough to cut same into crackers, means for imparting vertical movement to said cutter-head to effect the cutting operation, means for imparting longitudinal movement to said cutter-head during the cutting operation together with means for adjusting the relation between the aforesaid means to cause the cutting dies, after the cutting operation, to lift out of the dough when the same have reached their maximum longitudinal velocity, and means for adjusting said velocity to conform with the travel of the sheet of dough.

CLARE G. TUCKER.

Witnesses:
JAMES E. LARSH,
FRITZ STAEMPFLE.